(12) United States Patent
Kato et al.

(10) Patent No.: US 10,660,094 B2
(45) Date of Patent: May 19, 2020

(54) TERMINAL DEVICE, BASE STATION APPARATUS, AND COMMUNICATION METHOD

(71) Applicant: Sharp Kabushiki Kaisha, Sakai, Osaka (JP)

(72) Inventors: Katsuya Kato, Sakai (JP); Kazuyuki Shimezawa, Sakai (JP); Ryota Yamada, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/507,007

(22) PCT Filed: Aug. 28, 2015

(86) PCT No.: PCT/JP2015/074386
§ 371 (c)(1),
(2) Date: Feb. 27, 2017

(87) PCT Pub. No.: WO2016/043018
PCT Pub. Date: Mar. 24, 2016

(65) Prior Publication Data
US 2018/0234971 A1 Aug. 16, 2018

(30) Foreign Application Priority Data
Sep. 19, 2014 (JP) ................. 2014-190869

(51) Int. Cl.
*H04W 72/04* (2009.01)
*H04L 5/00* (2006.01)

(52) U.S. Cl.
CPC ....... *H04W 72/0453* (2013.01); *H04L 5/0053* (2013.01); *H04W 72/042* (2013.01); *H04W 72/0446* (2013.01); *H04L 5/001* (2013.01)

(58) Field of Classification Search
CPC .......... H04W 72/0453; H04W 72/042; H04W 72/0446; H04W 72/0053; H04L 72/0053
(Continued)

(56) References Cited

U.S. PATENT DOCUMENTS 8,774,101 B2 * 7/2014 Lim ................ H04L 5/0007
370/329
2002/0160737 A1 * 10/2002 Crawford ............. H04B 7/0811
455/272

(Continued)

FOREIGN PATENT DOCUMENTS

JP       2013-1977015 A     9/2013
JP       2014-27429 A       2/2014
WO       WO 2013/141194 A1  9/2013

OTHER PUBLICATIONS

Advanced Lte, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2", (Release 12), Technical Specification, 3GPP TS 36.300, V12.2.0, (Jun. 2014).

(Continued)

*Primary Examiner* — Ricky Q Ngo
*Assistant Examiner* — Ellen A Kirillova
(74) *Attorney, Agent, or Firm* — Birch, Stewart, Kolasch & Birch, LLP

(57) ABSTRACT

A terminal device uses a broad band to improve a throughput. A terminal device communicates with a base station apparatus, and includes a higher layer processing unit that receives an instruction from the base station apparatus to perform communication according to a first frame structure used in a prescribed carrier frequency band or to perform communication according to a second frame structure used in a carrier frequency band higher than the prescribed carrier (Continued)

frequency band, and a reception unit that receives a signal of the first frame structure in a case where it is instructed to perform the communication according to the first frame structure, and receives a signal of the second frame structure in a case where it is instructed to perform the communication according to the second frame structure.

6 Claims, 5 Drawing Sheets

(58) Field of Classification Search
    USPC .......................................................... 370/329
    See application file for complete search history.

(56) References Cited

U.S. PATENT DOCUMENTS

| | | | | |
|---|---|---|---|---|
| 2010/0067478 A1* | 3/2010 | Dillinger | ............... | H04B 7/12 370/330 |
| 2010/0074159 A1* | 3/2010 | Yamada | ............... | H04W 72/005 370/312 |
| 2010/0195614 A1* | 8/2010 | Nimbalker | ........ | H04W 72/1289 370/330 |
| 2012/0026936 A1* | 2/2012 | Zhang | ................. | H04B 7/2606 370/315 |
| 2014/0126403 A1* | 5/2014 | Siomina | ................ | H04W 24/10 370/252 |
| 2015/0023235 A1* | 1/2015 | Lightstone | ........ | H04W 52/0206 370/311 |
| 2015/0172034 A1 | 6/2015 | Kishiyama et al. | | |
| 2015/0282178 A1 | 10/2015 | Kim et al. | | |

OTHER PUBLICATIONS

MediaTek Inc., "On Scenarios and Necessity of Standalone NCT", R1-131173, 3GP TSG-RAN WG1 #72bis, Chicago, USA, Apr. 15-19, 2013.

* cited by examiner

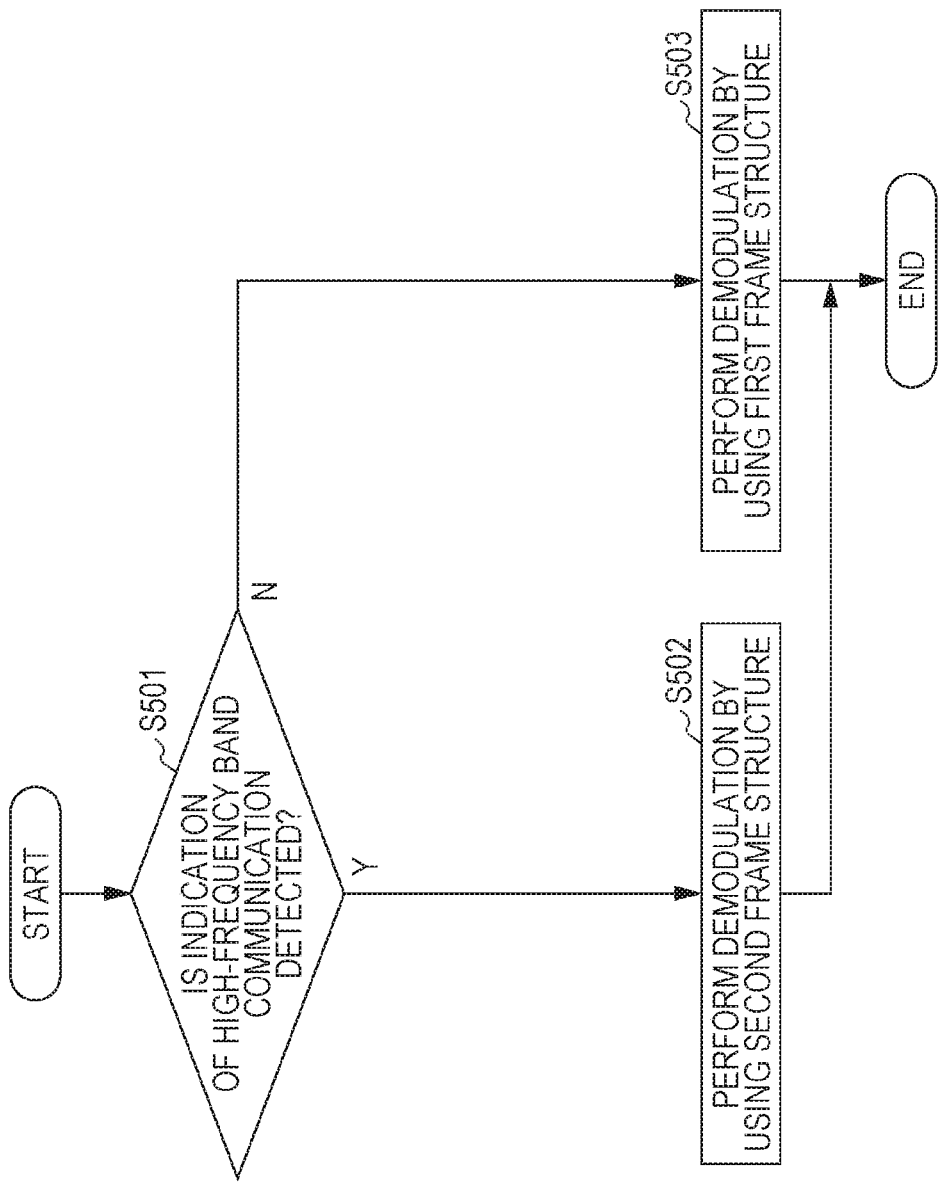

TERMINAL DEVICE, BASE STATION APPARATUS, AND COMMUNICATION METHOD

TECHNICAL FIELD

The present invention relates to a terminal device, a base station apparatus, and a communication method.

BACKGROUND ART

In recent years, with the spread of smart phones and tablet devices, traffic in mobile transmission has continued to exponentially increase and is expected to increase further in the future. As one of measures for the increase in wireless traffic, increasing the bandwidth is being considered. In Long Term Evolution (LTE) or LTE-Advanced (LTE-A) by 3rd Generation Partnership Project (3GPP), carrier aggregation that realizes broadband by bundling a plurality of component carriers is being studied. The carrier aggregation is described in NPL 1. In a method of NPL 1, a system bandwidth of a single component carrier is set to maximum 20 MHz, and the maximum number of component carriers assigned to a single terminal device is set to five.

CITATION LIST

Non Patent Literature

NPL 1: 3GPP TS 36.300 V12.2.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)," June in 2014.

SUMMARY OF INVENTION

Technical Problem

However, there is a problem in which the method described in NPL 1 is able to broaden the bandwidth only up to maximum 100 MHz and there is a limit to an increase in wireless traffic.

The present invention has been made in view of these circumstances, and its object is to provide a terminal device, a base station apparatus, and a communication method, in which communication using a wider band is available.

Solution to Problem

The configurations of a terminal device, a base station apparatus, and a communication method according to the present invention to solve the problems described above are as follows.

Included are a higher layer processing unit that determines whether to instruct to communicate a signal of a second frame structure using a frequency band of 10 GHz or more, and a reception unit that receives a signal of the second frame structure in a case where it is instructed to communicate the signal of the second frame structure from the higher layer processing unit.

In the terminal device of the present invention, the higher layer processing unit receives an instruction to perform the communication of the signal of the second frame structure from a signal of a first frame structure using a frequency band less than 10 GHz.

In the terminal device of the present invention, the higher layer processing unit notifies that the terminal device has a function of receiving the signal of the second frame structure.

A base station apparatus of the present invention includes a higher layer processing unit that sets information on whether or not a signal of a second frame structure using a frequency band of 10 GHz or more is transmitted in a higher layer, and a transmission unit that transmits the signal of the second frame structure in a case where it is set to transmit the signal of the second frame structure in the higher layer processing unit.

In the base station apparatus of the present invention, the higher layer processing unit includes the information on whether or not the signal of a second frame structure is transmitted, in a signal of a first frame structure using a frequency band less than 10 GHz.

The base station apparatus of the present invention, the higher layer processing unit receives information on whether or not a terminal device of a communication partner has a function of receiving the signal of the second frame structure to be notified.

A communication method of the present invention is a communication method of a terminal device, and includes a higher layer processing step of determining whether to instruct to communicate a signal of a second frame structure using a frequency band of 10 GHz or more, and a reception step of receiving a signal of the second frame structure in a case where it is instructed to communicate the signal of the second frame structure in the higher layer processing step.

A communication method of the present invention is a communication method of a base station apparatus, and includes a higher layer processing step of setting information on whether or not a signal of a second frame structure using a frequency band of 10 GHz or more is transmitted in a higher layer, and a transmission step of transmitting the signal of the second frame structure in a case where it is set to transmit the signal of the second frame structure in the higher layer processing unit.

Advantageous Effects of Invention

According to the present invention, a terminal device can improve a throughput by using a wide band.

BRIEF DESCRIPTION OF DRAWINGS

FIG. 5 is a diagram illustrating a processing flow of the terminal device in the present embodiment.

DESCRIPTION OF EMBODIMENTS

A communication system in the present embodiment includes a base station apparatus (a transmission device, a cell, a transmit point, a transmit antenna group, a transmit antenna port group, a component carrier, or an eNodeB) and a terminal device (a terminal, a mobile terminal, a reception point, a reception terminal, a reception device, a receive antenna group, a receive antenna port group, or a UE).

In the present embodiment, "X/Y" includes the meaning of "X or Y". In the present embodiment, "X/Y" includes the meaning of "X and Y". In the present embodiment, "X/Y" includes the meaning of "X and/or Y".

Figure 1:
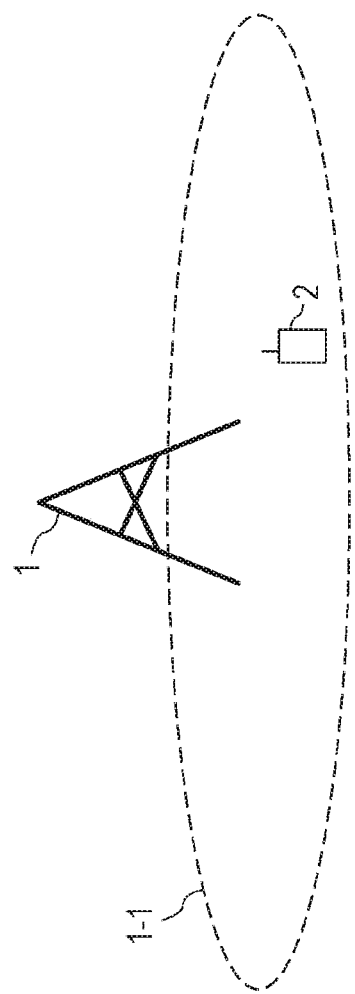
FIG. 1 is a diagram illustrating an example of a communication system according to a present embodiment.

FIG. 1 is a diagram illustrating an example of a communication system according to a present embodiment. As illustrated in FIG. 1, the communication system in this embodiment includes a base station apparatus 1 and a terminal device 2. Further, a coverage 1-1 is a range (communication area) in which the base station apparatus 1 is connectable to the terminal device.

In FIG. 1, in uplink wireless communication from the terminal device 2 to the base station apparatus 1, the following uplink physical channels are used. The uplink physical channels are used to transmit information output from a higher layer.

Physical Uplink Control Channel (PUCCH)
Physical Uplink Shared Channel (PUSCH)
Physical Random Access Channel (PRACH)

PUCCH is used to transmit uplink control information (UCI). Here, the uplink control information includes positive acknowledgement (ACK) or negative acknowledgement (NACK) (ACK/NACK) for downlink data (downlink transport block, downlink-shared channel: DL-SCH). The ACK/NACK for the downlink data is also referred to as HARQ-ACK, or HARQ feedback.

In addition, the uplink control information includes channel state information (CSI) for the downlink. Further, the uplink control information includes a scheduling request (SR) which is used to request resources of the uplink shared channel (UL-SCH).

PUSCH is used to transmit uplink data (uplink transport block, UL-SCH). Further, PUSCH, together with uplink data, may be used to transmit ACK/NACK and/or the channel state information. Further, PUSCH may be used to transmit only the uplink control information.

Further, PUSCH is used to transmit the RRC message. The RRC message is information/signal processed in a radio resource control (RRC) layer. Further, PUSCH is used to transmit a MAC control element (CE). Here, MAC CE is information/signal processed (transmitted) in a medium access control (MAC) layer.

For example, power headroom may be included in the MAC CE, and reported through PUSCH. That is, the field of MAC CE may also be used to indicate the level of the power headroom.

PRACH is used to transmit a random access preamble.

Further, in uplink wireless communication, an uplink reference signal (UL RS) is used as an uplink physical signals. The uplink physical signal is not used to transmit information output from the higher layer, but is used by the physical layer. Here, the uplink reference signal includes a demodulation reference signal (DMRS) and a sounding reference signal (SRS).

DMRS is related to the transmission of PUSCH or PUCCH. For example, the base station apparatus 1 uses DMRS to perform channel correction of PUSCH or PUCCH. SRS is not related to the transmission of PUSCH or PUCCH. For example, the base station apparatus 1 uses SRS to measure the uplink channel state.

In FIG. 1, in downlink wireless communication from the base station apparatus 1 to the terminal device 2, the following downlink physical channels are used. The downlink physical channels are used to transmit information output from a higher layer.

Physical Broadcast Channel (PBCH)
Physical Control Format Indicator Channel (PCFICH)
Physical Hybrid automatic repeat request Indicator Channel (PHICH)
Physical Downlink Control Channel (PDCCH)
Enhanced Physical Downlink Control Channel (EPDCCH)
Physical Downlink Shared Channel (PDSCH)

PBCH is used to broadcast a master information block (MIB, Broadcast channel: BCH) used in the terminal device 2. PCFICH is used to transmit information indicating an area (for example, the number of OFDM symbols) used for transmission of PDCCH.

PHICH is used to transmit the ACK/NACK for the uplink data received by the base station apparatus 1. That is, PHICH is used to transmit a HARQ indicator (HARQ feedback) indicating the ACK/NACK for the uplink data.

PDCCH and EPDCCH are used to transmit downlink control information (DCI). Here, a plurality of DCI formats are defined for the transmission of the downlink control information. That is, the field for the downlink control information is defined in the DCI formats and information bits are mapped thereto.

For example, a DCI format 1A used for the scheduling of one PDSCH in one cell (transmission of one downlink transport block) is defined, as the DCI format for the downlink.

For example, the DCI format for the downlink includes downlink control information such as information on the resource allocation of PDSCH, information on a modulation and coding scheme (MCS) for PDSCH, and a TPC command for PUCCH. Here, a DCI format for the downlink is also referred to as downlink grant (or downlink assignment).

For example, a DCI format 0 used for the scheduling of one PUSCH in one cell (transmission of one uplink transport block) is defined, as the DCI format for the uplink.

For example, the DCI format for the uplink includes uplink control information such as information on the resource allocation of PUSCH, information on MCS for PUSCH, and a TPC command for PUSCH. The DCI format for the uplink is also referred to as uplink grant (or uplink assignment).

Further, the DCI format for the uplink can be used to request (CSI request) the channel state information (CSI: it is also referred to as reception quality information) for the downlink. The channel state information corresponds to a Rank Indicator (RI) to specify the suitable spatial multiplexing number, a Precoding Matrix Indicator (PMI) to specify a suitable precoder, a Channel Quality Indicator (CQI) to specify a suitable transmission rate, and the like.

Further, the DCI format for the uplink can be used for a setting indicating the uplink resource to which channel state information report (CSI feedback report, CSI reporting) fed back to the base station apparatus by the terminal device is mapped. For example, the channel state information report can be used for a setting indicating the uplink resources to report regularly (periodically) the channel state information (Periodic CSI). The channel state information report can be used to set a mode for periodically reporting the channel state information (CSI report mode).

For example, the channel state information report can be used for a setting indicating the uplink resources to report irregular (aperiodic) channel state information (Aperiodic CSI). The channel state information report can be used to set a mode for aperiodically reporting the channel state information (CSI reporting mode). The base station apparatus 1 is capable of setting one of the periodic channel state information report and the aperiodic channel state information report. Further, the base station apparatus 1 is capable of setting both the periodic channel state information report and the aperiodic channel state information report.

Further, the DCI format for the uplink can be used for a setting indicating the type of the channel state information report which is fed back to the base station apparatus by the terminal device. The types of channel state information report include broadband CSI (for example, Wideband CQI) and narrowband CSI (for example, Subband CQI), and the like.

Further, the DCI format for the uplink can be used for a mode setting including the periodic channel state information report or the aperiodic channel state information report, and a type of the channel state information report. For example, there are a mode to report the aperiodic channel state information report and broadband CSI, a mode to report the aperiodic channel state information report and narrowband CSI, a mode to report the aperiodic channel state information report, broadband CSI, and narrowband CSI, a mode to report the periodic channel state information report and broadband CSI, a mode to report the periodic channel state information report and narrowband CSI, a mode to report the periodic channel state information report, broadband CSI, and narrowband CSI, and the like.

When the PDSCH resource is scheduled using downlink assignment, the terminal device 2 receives downlink data in the scheduled PDSCH. Further, when the PUSCH resource is scheduled using the uplink grant, the terminal device 2 transmits uplink data and/or uplink control information in the scheduled PUSCH.

PDSCH is used to transmit downlink data (downlink transport block, DL-SCH). Further, PDSCH is used to transmit the system information block type 1 message. System information block type 1 message is cell specific information.

Further, PDSCH is used to transmit the system information message. The system information message includes a system information block X other than the system information block type 1. System Information message is cell specific information.

Further, PDSCH is used to transmit an RRC message. Here, an RRC message transmitted from the base station apparatus 1 may be common to a plurality of terminal devices 2 in a cell. Further, the RRC message transmitted from the base station apparatus 1 may be a dedicated message to a certain terminal device 2 (also referred to as dedicated signaling). That is, user equipment specific information is transmitted using a dedicated message to a certain terminal device 2. Further, PDSCH is used to transmit the MAC CE.

Here, the RRC message and/or the MAC CE are also referred to as a higher layer signal (higher layer signaling).

Further, in the downlink wireless communication, a synchronization signal (SS) and a downlink reference signal (DL RS) is used as a downlink physical signal. The downlink physical signal is not used to transmit information output from the higher layer, but is used by the physical layer.

The synchronization signal is used by the terminal device 2 to synchronize the downlink frequency domain and time domain. Further, the downlink reference signal is used for the terminal device 2 to perform the channel correction of the downlink physical channel. For example, the downlink reference signal is used for the terminal device 2 to calculate the channel state information of the downlink.

Here, a Cell-specific Reference Signal (CRS), a UE-specific Reference Signal (UERS) related to the PDSCH, a Demodulation Reference Signal (DMRS) related to the EPDCCH, a Non-Zero Power Channel State Information— Reference Signal (NZP CSI-RS), and Zero Power Channel State Information—Reference Signal (ZP CSI-RS) are included in the downlink reference signal.

The CRS is transmitted in the entire band of the subframe, and is used to perform demodulation of the PBCH/PDCCH/PHICH/PCFICH/PDSCH. A URS related to the PDSCH is transmitted in a subframe and a bandwidth used for the transmission of the PDSCH related to the URS, and is used to perform demodulation of the PDSCH related to the URS.

A DMRS related to the EPDCCH is transmitted in a subframe and a bandwidth used for the transmission of the EPDCCH related to the DMRS. The DMRS is used to perform demodulation of the EPDCCH related to the DMRS.

The resources of NZP CSI-RS is set by the base station apparatus 1. For example, the terminal device 2 performs the measurement of a signal (channel measurement) by using the NZP CSI-RS. The resources of ZP CSI-RS is set by the base station apparatus 1. The base station apparatus 1 transmits the ZP CSI-RS at a zero-output. For example, the terminal device 2 performs the measurement of interference in the resource corresponding to the NZP CSI-RS.

Here, downlink physical channels and downlink physical signals are also collectively referred to as downlink signals. Further, uplink physical channels and uplink physical signals are also collectively referred to as uplink signals. Further, uplink physical channels and downlink physical channels are also collectively referred to as physical channels. Further, uplink physical signals and downlink physical signals are also collectively referred to as physical signals.

Further, BCH, UL-SCH, and DL-SCH are transport channels. The channel used in the MAC layer is referred to as a transport channel. Further, the unit of a transport channel used in the MAC layer is also referred to as a transport block (TB) or a MAC Protocol Data Unit (PDU). The transport block is a unit of data which is passed (delivered) from the MAC layer to the physical layer. In the physical layer, the transport block is mapped to a code word, and an encoding process is performed for each code word.

The base station apparatus of the present embodiment can perform broadband transmission by using a high-frequency band. In a case of communicating using the high-frequency band, the base station apparatus can communicate using a frame structure different from that in the related art. The frame structure contains a subcarrier spacing, a maximum system bandwidth, a communication frequency band, a resource block (RB) size, the number of resource blocks, the number of resource elements, a frame length, a subframe length, parameters of slots or the like. Here, the frame structure in the related art is also referred to as a first frame structure (first radio access technology (RAT)), and a frame structure when communicating in the high-frequency band is also referred to as a second frame structure (second radio access technology). Incidentally, the high-frequency band indicates a frequency band higher than a prescribed frequency band. For example, the prescribed frequency band is 6 GHz band, a 10 GHz band, or the like. For example, in a case where the prescribed frequency band is 10 GHz band, the first frame structure may be used in a band less than 10 GHz, and the second frame structure may be used in a band over 10 GHz.

For example, in the second frame structure, it is possible to increase the number of resource blocks, as compared to the first frame structure. In this case, if the subcarrier spacings in the orthogonal frequency division multiplexing (OFDM) symbol are the same, communication is possible in the second frame structure in resource blocks of a greater number than the first frame structure, so broadband communication is possible. Further, in a case where the number of resource blocks is increased, the number of FFT points of inverse fast Fourier transform (IFFT) used in a case of generating an OFDM symbol increases. For example, in a case where the number of resource blocks used in the second frame structure is maximum 500, the number of FFT points may be 8192.

Further, for example, in the second frame structure, it is possible to increase the number of subcarriers per resource block, as compared to the first frame structure. In this case, even if the number of resource blocks available in each of the second frame structure and the first frame structure is the same, broadband communication becomes possible. For example, it is possible to set the number of subcarriers per resource block used in the second frame structure to n times the number of subcarriers per resource block used in the first frame structure (n is a natural number). For example, in a case where n=5, the number of subcarriers per resource block of the second frame structure becomes 60, the number of FFT points used in the OFDM symbol generation may be 8192.

Further, one resource block in the second frame structure can also be configured with a plurality of resource blocks in the first frame structure. For example, in a case where the number of subcarriers of the resource block in the second frame structure is 60, the resource block in the second frame structure is configured with five resource blocks in the first frame structure. In the second frame structure, the resource block in the first frame structure can be referred to as a subresource block. As another way, the second frame structure includes a resource block set which is configured with a plurality of resource blocks in the first frame structure, and it is possible to use the resource block set similarly to the resource blocks in the first frame structure.

Further, for example, in the second frame structure, it is possible to widen the subcarrier spacing in an OFDM symbol, as compared to the first frame structure. In this case, in the second frame structure, resource blocks having the same size as the first frame structure, and resource blocks of the same number as that of first frame structure are available, the OFDM symbol length of the second frame structure is shorter than the OFDM symbol length of the first frame structure. For example, it is possible to set the subcarrier spacing in the OFDM symbol in the second frame structure to m times the subcarrier spacing in the first frame structure (m is a natural number). For example, in the case of m=5, the subcarrier spacing in the OFDM symbol of the second frame structure is 75 kHz, and the OFDM symbol length in the second frame structure is one-fifth of the OFDM symbol length in a first frame structure. Incidentally, the CP length to be added to the OFDM symbol may be one-fifth. At this time, in a case of using the second frame structure, the base station apparatus can use a frame with 10 ms as a unit, and a subframe with 1 ms as a unit, as in the first frame structure. In this case, the numbers of OFDM symbols included in one frame/subframe are different in the first frame structure and the second frame structure.

Further, in a case where subcarrier spacings are different, and the frame lengths and the subframe lengths are identical in the first frame structure and the second frame structure, as compared to the first frame structure, the number of OFDM symbols included in one frame and one subframe increases in the second frame structure. For example, in the second frame structure, in a case where the subcarrier spacing is 75 kHz and the OFDM symbol length is one-fifth of that of the first frame structure, the number of OFDM symbols included in one subframe is 70 symbols.

Further, in a case where subcarrier spacings are different, and the subframe lengths and the numbers of OFDM symbols in one subframe are identical in the first frame structure and the second frame structure, the subframe length in the second frame structure is shortened, and the number of subframes in one frame is increased. For example, the subcarrier spacing in an OFDM symbol in the second frame structure is 75 kHz, and the OFDM symbol length in the second frame structure becomes one-fifth. At this time, the subframe length in the second frame structure is 0.2 milliseconds, and the number of subframes in one frame is 50. In the second frame structure, it is possible to use a subframe group including a plurality of subframes. For example, in this example, one subframe group is configured with 10 subframes, and the same operation/processing as in the subframe in the first frame structure is performed in one subframe group. In another example, one subframe group is configured with five subframes, and the subframe group and the subframe in the first frame structure have a similar role. In other words, the subframe in the second frame structure includes a plurality of subframes in the first frame structure.

Further, for example, in the second frame structure, as compared to the first frame structure, at least one of the subcarrier spacing in the OFDM symbols, the number of resource blocks, and the number of subcarriers per resource block can be different from each other.

Further, in a case where the terminal device is capable of performing carrier aggregation, if the second frame structure is used, the base station apparatus can set the secondary cell (SCell) of a greater number than in a case of using the first frame structure. Further, the first frame structure can be used in a primary cell (PCell), and the second frame structure can be used in the secondary cell. In this case, the second frame structure is used only in the case of carrier aggregation. That is, the terminal device is capable of performing carrier aggregation of the first frame structure and the second frame structure.

Further, in a case where the subcarrier spacings are different, and the frame lengths and the subframe lengths are respectively the same in the first frame structure and the second frame structure, if transmission of the first frame structure is performed in the primary cell and transmission of the second frame structure is performed in the secondary cell, the terminal device can assume that the subframes (subframe break, subframe index) of the primary cell and the secondary cell are synchronized.

Further, in a case where the subframe length of the second frame structure is shorter as compared to the first frame structure, if transmission of the first frame structure is performed in the primary cell and transmission of the second frame structure is performed in the secondary cell, the terminal device assumes that one subframe of the primary cell and a plurality of subframes (subframe group) of the secondary cell are synchronized. For example, in a case where the subframe length of the second frame structure is one-fifth as compared to the first frame structure, the terminal device can assume that the n-th (n is an integer of 0 or more) subframe of the primary cell is synchronized with the 5n-th subframe, the (5n+1)-th subframe, the (5n+2)-th subframe, the (5n+3)-th subframe, and the (5n+4)-th subframe of the secondary cell.

Although the first frame structure can be used in Frequency Division Duplex (FDD) and Time Division Duplex (TDD), the second frame structure can be used only in TDD.

FDD and TDD are also respectively referred to as a first frame structure type (frame structure type 1) and a second frame structure type (frame structure type 2). Further, in the first frame structure, only the first frame structure type or the second frame structure type may be set. In the second frame structure, only a third frame structure type different from the first frame structure type or the second frame structure type may be set. That is, the frame structure type used in the second frame structure can be different from FDD or TDD.

The second frame structure can be so used only in the downlink.

The second frame structure may be set only as a secondary cell. In that case, the first frame structure can be set as a primary cell.

In the first frame structure, the terminal device can assume that at least CRS is transmitted in the serving cell which is in an activated state. In the second frame structure, the terminal device can assume that at least CRS is not transmitted.

Figure 2:
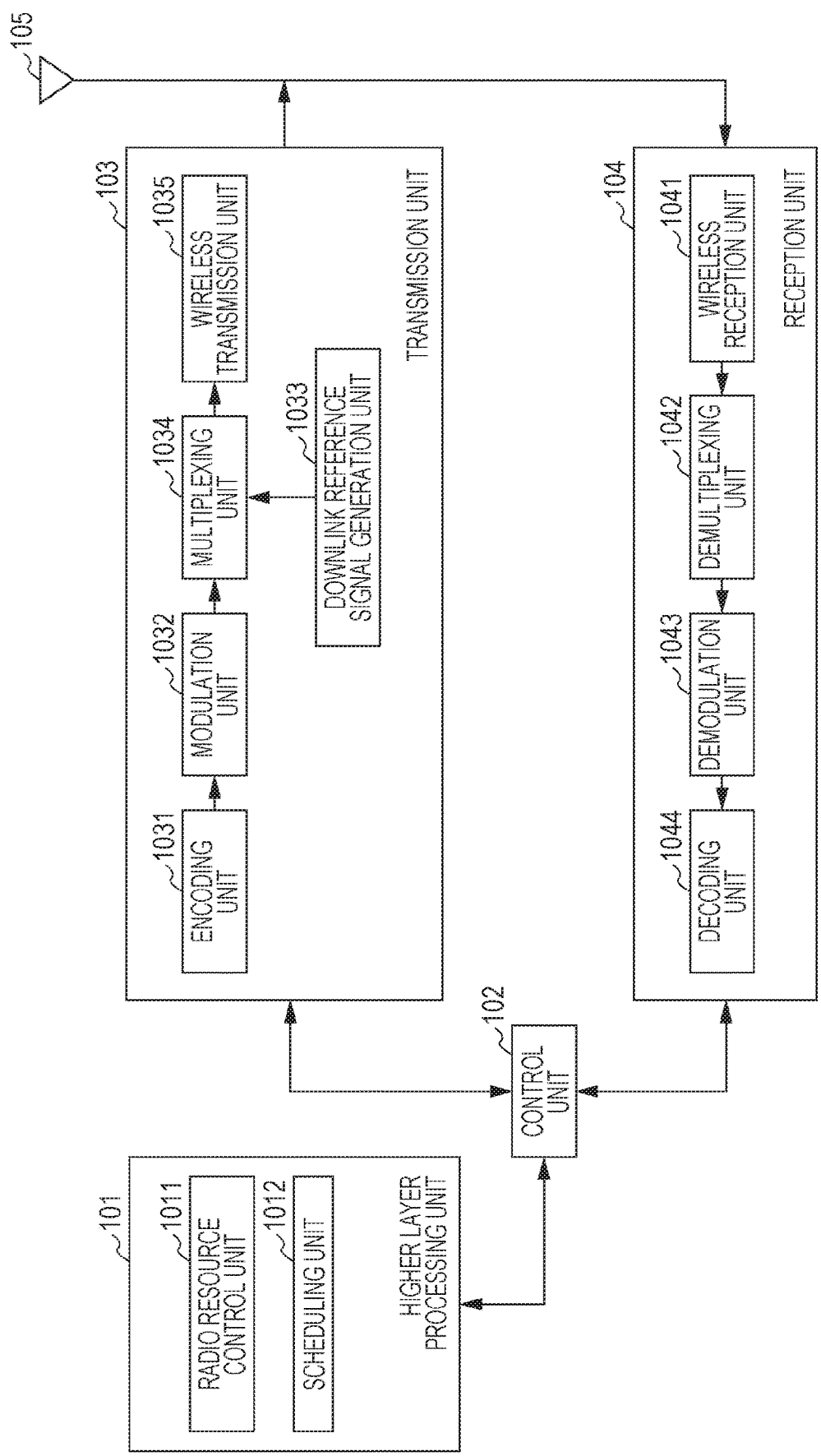
FIG. 2 is a schematic block diagram illustrating a configuration of a base station apparatus in the present embodiment.

FIG. 2 is a schematic block diagram illustrating a configuration of a base station apparatus in the present embodiment. As illustrated in FIG. 2, the base station apparatus is configured to include a higher layer processing unit 101, a control unit 102, a transmission unit 103, a reception unit 104, and a transmission/receive antenna 105. Further, the higher layer processing unit 101 is configured to include a radio resource control unit 1011, and a scheduling unit 1012. Further, the transmission unit 103 is configured to include an encoding unit 1031, a modulation unit 1032, a downlink reference signal generation unit 1033, a multiplexing unit 1034, and a wireless transmission unit 1035. Further, the reception unit 104 is configured to include a wireless reception unit 1041, a demultiplexing unit 1042, a demodulation unit 1043, and a decoding unit 1044.

The higher layer processing unit 101 processes a Medium Access Control (MAC) layer, a Packet Data Convergence Protocol (PDCP) layer, a Radio Link Control (RLC) layer, and a Radio Resource Control (RRC). In addition, the higher layer processing unit 101 generates information necessary for controlling the transmission unit 103 and the reception unit 104, and outputs the information to the control unit 102.

The higher layer processing unit 101 receives the terminal device information such as the function (UE capability) of the terminal device. In other words, the terminal device transmits its functions to the base station apparatus, as a higher layer signaling.

In the following description, the terminal device information contains information indicating whether or not the terminal device supports a prescribed function, or information indicating that the terminal device introduces and completes a test for a prescribed function. In the following description, whether to support a prescribed function includes whether to introduce and complete a test for a prescribed function. For example, in a case where the terminal device supports a prescribed function, the terminal device transmits the information indicating whether or not the terminal device supports a prescribed function, or the information indicating that the terminal device introduces and completes a test for a prescribed function. In a case where the terminal device does not support a prescribed function, the terminal device does not transmit the information indicating whether or not the terminal device supports a prescribed function, or the information indicating that the terminal device introduces and completes a test for a prescribed function. That is, whether or not the terminal device transmits the information indicating whether or not the terminal device supports a prescribed function, or the information indicating that the terminal device introduces and completes a test for a prescribed function indicates whether or not the terminal device supports a prescribed function.

For example, in a case where the terminal device supports a prescribed function, the terminal device transmits the information (parameters) indicating whether or not the terminal device supports a prescribed function. In a case where the terminal device does not support a prescribed function, the terminal device does not transmit the information (parameters) indicating whether or not the terminal device supports a prescribed function. In other words, whether or not to support the prescribed function is informed by whether or not to transmit the information (parameters) indicating whether or not to support the prescribed function. Incidentally, the information (parameters) indicating whether or not to support a prescribed function may be notified by using a one bit of 1 or 0.

The function of the terminal device can include a parameter indicating whether or not to support a high-frequency band. In addition, in the terminal device in a prescribed release, supporting a high-frequency band can also be mandatory.

The radio resource control unit 1011 generates downlink data allocated to the PDSCH (transport block) of the downlink, system information, an RRC message, MAC CE, or the like, or acquires them from the higher node. The radio resource control unit 1011 outputs the downlink data to the transmission unit 103, and outputs the other information to the control unit 102. In addition, the radio resource control unit 1011 manages various types of setting information of the terminal device 2.

The base station apparatus transmits information indicating whether or not a high-frequency band signal is transmitted, as a higher layer signaling. The communication in the higher frequency band may be settable in all cells of PCells and Scell, may be settable only in PCells, or may be settable only in Scell.

The scheduling unit 1012 determines the frequency and subframe to which the physical channels (PDSCH and PUSCH) are assigned, the coding rate and modulation scheme (or MCS), the transmit power and the like of the physical channels (PDSCH and PUSCH). The scheduling unit 1012 outputs the determined information to the control unit 102.

In a case of using the second frame structure, the base station apparatus performs assignment of the UE, at each resource block, and/or at each resource block set, and/or at each subframe, and/or at each subframe set.

The scheduling unit 1012 generates information used for scheduling of the physical channels (PDSCH and PUSCH), based on the scheduling result. The scheduling unit 1012 outputs the generated information to the control unit 102.

In the second frame structure, it is possible to use a MCS of a larger value than in the first frame structure. That is, in the second frame structure, it is possible to communicate at a higher bit rate than in the case of using the first frame structure. In the second frame structure, it is possible to assign a larger number of code words for one UE than in the first frame structure. In the second frame structure, it is possible to perform transmission at a higher rank number than in the case of using the first frame structure. In the second frame structure, it is possible to correspond to a larger number of antenna ports than in the case of using the first frame structure.

The control unit 102 generates a control signal for controlling the transmission unit 103 and the reception unit 104, based on the information input from the higher layer processing unit 101. Further, the control unit 102 determines the MCS, based on the information input from the higher layer processing unit 101. Further, the control unit 102 determines the number of code words, based on the information input from the higher layer processing unit 101. Further, the control unit 102 determines the number of layers, the antenna port number, and the scrambling identifier (scrambling identity), based on the information input from the higher layer processing unit 101.

The control unit 102 generates downlink control information, based on the information input from the higher layer processing unit 101, and outputs it to the transmission unit 103. In a case where the base station apparatus is a primary cell, the setting information of the higher layer of the secondary cell may be included in the downlink control information.

The transmission unit 103 generates a downlink reference signal, in accordance with the control signal input from the control unit 102, encodes and modulates the HARQ indicator, the downlink control information, and the downlink data, which are received from the higher layer processing unit 101, multiplexes PHICH, PDCCH, EPDCCH, PDSCH, and multiplexes the downlink reference signal and transmits the signal to the terminal device 2 through the transmission/receive antenna 105. In a case of using a second frame structure, the base station apparatus multiplexes at least PDSCH, and does not to multiplex the downlink control information. In the second frame structure, it is possible to increase the frequency spacing/time spacing of the downlink reference signal, as compared to the first frame structure. Further, the base station apparatus can transmit the control information of a signal allocated to the second frame structure by using the first frame structure.

The encoding unit 1031 encodes the HARQ indicator, the downlink control information, and the downlink data, which are received from the higher layer processing unit 101, by using a predetermined coding method such as block coding, convolutional coding, and turbo coding, or by using a coding scheme determined by the radio resource control unit 1011. The modulation unit 1032 modulates the coded bits input from the encoding unit 1031, by using a predetermined modulation scheme such as Binary Phase Shift Keying (BPSK), quadrature Phase Shift Keying (QPSK), 16 quadrature amplitude modulation (QAM), 64 QAM, or 256 QAM, or a modulation scheme determined by the radio resource control unit 1011.

The downlink reference signal generation unit 1033, obtained by a predetermined rule based on a physical cell identifier (PCI) for identifying the base station apparatus 1, generates a sequence that the terminal device 2 knows, as a downlink reference signal. Further, the downlink reference signal generation unit 1033 can generate the DMRS based on scrambling identity.

The multiplexing unit 1034 multiplexes the modulation symbol of each modulated channel, the generated downlink reference signal, and the downlink control information. In other words, the multiplexing unit 1034 arranges the modulation symbol of each modulated channel, the generated downlink reference signal, and the downlink control information in the resource elements.

The wireless transmission unit 1035 performs modulation of an OFDM scheme by performing inverse fast Fourier transform (IFFT) on the multiplexed modulation symbols or the like, adds Cyclic Prefix (CP) to the OFDM modulated OFDM symbol, and generate a baseband digital signal. The wireless transmission unit 1035 converts the generated baseband digital signal into an analog signal of a desired band, by using filtering, Digital-to-Analog (DA) conversion, frequency conversion, power amplification and the like. The wireless transmission unit 1035 outputs and transmits the generated analog signal to the transmission/receive antenna 105.

The base station apparatus perform switching between use of the first frame structure or use of the second frame structure, depending on the frequency band for transmission.

In a case of using the first frame structure, the base station apparatus can set the subcarrier spacing in the OFDM symbol generated by the wireless transmission unit 1035 to, for example, 15 kHz. In a case of using the second frame structure, the base station apparatus can wide the subcarrier spacing in the OFDM symbol generated by the wireless transmission unit 1035 than the subcarrier spacing in the case of the first frame structure. In this way, the OFDM symbol length is shortened, thereby reducing the influence of phase noise. Further, it is possible to improve the performance in a case where the terminal device is moving. In the case of using the second frame structure, the base station apparatus can set the subcarrier spacing in the OFDM symbol generated by the wireless transmission unit 1035 to, for example, 75 kHz. In this way, the OFDM symbol length in the second frame structure becomes one-fifth of the OFDM symbol length in the first frame structure. The CP length to be added to the OFDM symbol in the second frame structure may be one-fifth of the CP length in the first frame structure. In the case of using the first frame structure, the base station apparatus can use a frame with 10 ms as a unit, and a subframe with 1 ms as a unit. In the case of using the second frame structure, the base station apparatus can use the same frame length and subframe length, even in a case where the subcarrier spacing in the OFDM symbol generated by the wireless transmission unit 1035 is set to 75 kHz. In this case, the number of OFDM symbols in the frame and in the subframe in the second frame structure is five times as compared to the case of the first frame structure. In the case of the first frame structure and the second frame structure, it is possible to set the number of OFDM symbols per subframe to the same value. In this case, the subframe in the second frame structure has 0.2 msec as a unit. At this time, the base station apparatus may use another term with 1 ms as one unit. That is, for example, in a case of using the second frame structure, the base station apparatus can use a subframe group with 1 ms as a unit. In the case where the subframe length is 0.2 ms, the subframe group is configured with five subframes.

In a case where the base station apparatus uses the second frame structure, the bandwidth of the OFDM symbol generated by the wireless transmission unit 1035 can be wider than the bandwidth of the OFDM symbol generated by the wireless transmission unit 1035 in the case of using the first frame structure. In this way, it is possible to communicate in a broad band in the case of using a high-frequency band, thereby improving the throughput of the communication with the terminal device.

In the case of using the first frame structure, the base station apparatus can use a resource block with 12 subcarriers and 14 OFDM symbols as one unit. In a case where the subcarrier spacing is 15 kHz, the system bandwidth is maximum 20 MHz, so the maximum number of RBs in the frequency direction is 100. On the other hand, in the case where the base station apparatus uses the second frame structure, if the bandwidth of the OFDM symbol generated by the wireless transmission unit 1035 is wider than in the OFDM symbols in the case of using the first frame structure, the acquired number of subcarriers of the OFDM symbol in the case of the second frame structure may be increased. For example, in a case where the base station apparatus uses the second frame structure, if the subcarrier spacing in the OFDM symbol is 75 kHz and the system bandwidth is maximum 500 MHz, the number of subcarriers is 6000. In the second frame structure, a resource block may be configured with 60 subcarriers and 14 OFDM symbols as one unit. In this way, the maximum number of RBs in the frequency direction is 100, and is consistent with the first frame structure. Alternatively, the definition of the resource block is the same as that of the first frame structure, and the maximum number of RBs in the frequency direction may be 500. Alternatively, using another term, it may define a different resource block from the resource block used by the primary base station apparatus 1A. For example, the resource block in the second frame structure can be configured with a plurality of subresource blocks of the same size as the resource block in the first frame structure. In other words, the resource block in the second frame structure is the same size as the resource block in the first frame structure, and the second frame structure has a resource block set configured with a plurality of resource blocks.

The reception unit 104 separates, demodulates, and decodes the signal received from the terminal device 2 through the transmission/receive antenna 105, according to the control signal input from the control unit 102, and outputs the decoded information to the higher layer processing unit 101.

The wireless reception unit 1041 converts an uplink signal received through the transmission/receive antenna 105 into a baseband digital signal, by using frequency conversion, filtering, Analog-to-Digital (AD) conversion amplitude control or the like.

The wireless reception unit 1041 removes a portion corresponding to CP from the converted digital signal. The wireless reception unit 1041 performs fast Fourier transform (FFT) on the signal obtained by removing the CP, extracts a signal in the frequency domain, and outputs the extracted signal to the demultiplexing unit 1042.

The demultiplexing unit 1042 separates the signal input from the wireless reception unit 1041 into signals such as PUCCH, PUSCH, and an uplink reference signal. Incidentally, this separation is performed, based on the allocation information of radio resources which is determined in advance by the base station apparatus 1 in the radio resource control unit 1011 and is included in the uplink grant notified to each terminal device 2.

Further, the demultiplexing unit 1042 performs compensation of the channels of the PUCCH and PUSCH. In addition, the demultiplexing unit 1042 separates the uplink reference signal.

The demodulation unit 1043 performs Inverse Discrete Fourier Transform (IDFT) on PUSCH to acquire the modulation symbol, and demodulates the received signal by using a modulation scheme such as BPSK, QPSK, 16 QAM, 64 QAM, or 256 QAM which is determined in advance for each modulation symbol of the PUCCH and PUSCH, or a modulation scheme which notified in advance to each terminal device 2 by the base station apparatus in the uplink grant. Incidentally, the inverse discrete Fourier transform may be inverse fast Fourier transform corresponding to the number of subcarriers of PUSCH.

The decoding unit 1044 decodes the coded bits of the demodulated PUCCH and PUSCH, at a coding rate which is determined in advance of a predetermined encoding method, or which is notified in advance to the terminal device 2 in the uplink grant by the base station apparatus, and outputs the decoded uplink data and the uplink control information to the higher layer processing unit 101. In a case where PUSCH is retransmitted, the decoding unit 1044 performs decoding by using the coded bits held in the HARQ buffer which is input from the higher layer processing unit 101 and the demodulated coded bits.

Figure 3:
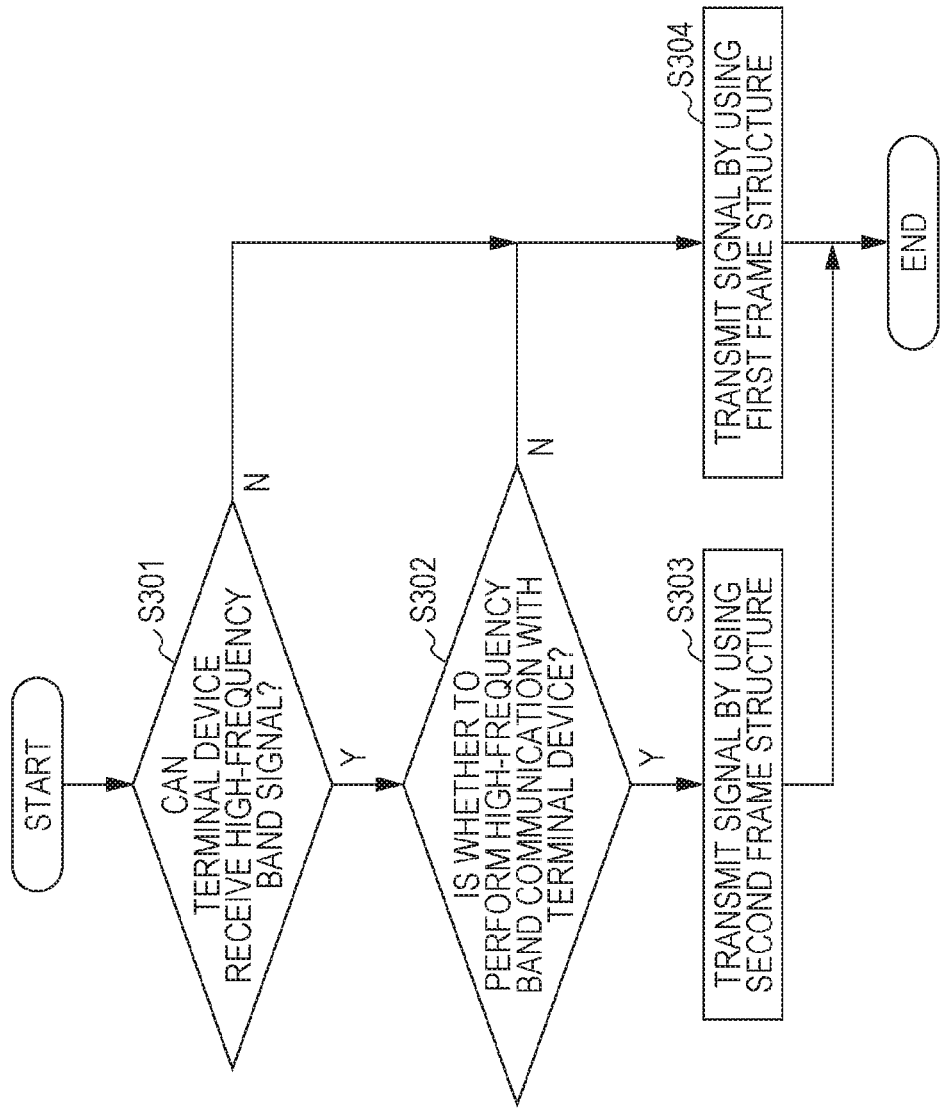
FIG. 3 is a diagram illustrating a processing flow of the base station apparatus in the present embodiment.

FIG. 3 is a diagram illustrating a flow of a process in which the control unit 102 sets downlink control information of the terminal device 2.

In S301, the control unit 102 determines whether or not the terminal device can receive a high-frequency band signal, by using terminal device information received from the terminal device.

In S302, the control unit 102 determines whether to perform high-frequency band communication with the terminal device.

In S303, the base station apparatus generates a transmit signal by using a second frame structure, and transmits it to the terminal device.

In S304, the base station apparatus generates a transmit signal by using a first frame structure, and transmits it to the terminal device.

Figure 4:
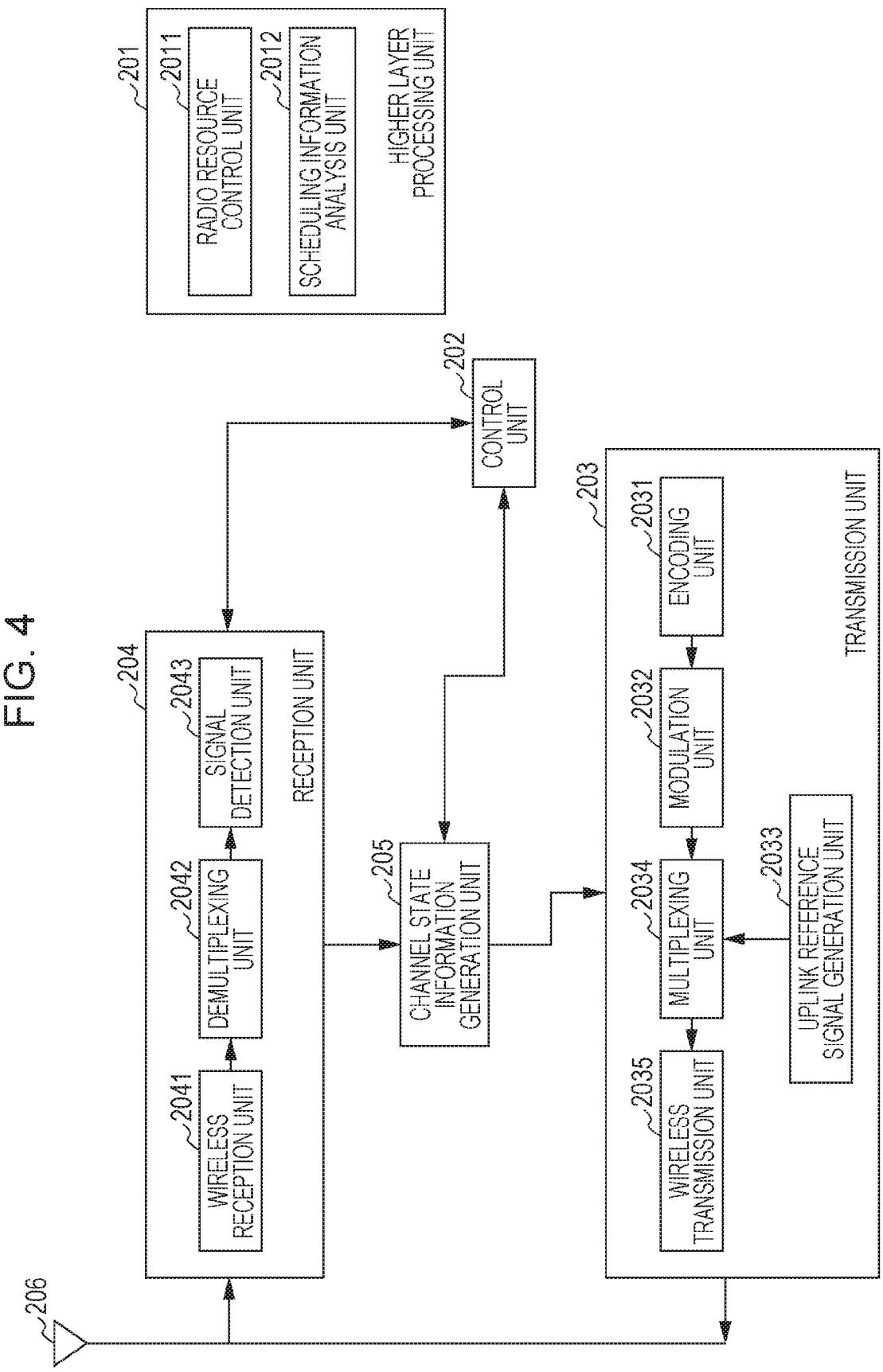
FIG. 4 is a schematic block diagram illustrating a configuration of a terminal device in the present embodiment.

FIG. 4 is a schematic block diagram illustrating a configuration of a terminal device in the present embodiment. As illustrated in FIG. 4, the terminal device is configured to include a higher layer processing unit 201, a control unit 202, a transmission unit 203, a reception unit 204, a channel state information generation unit 205 and a transmission/receive antenna 206. Further, the higher layer processing unit 201 is configured to include a radio resource control unit 2011, and a scheduling information interpretation unit 2012. Further, the transmission unit 203 is configured to include an encoding unit 2031, a modulation unit 2032, a uplink reference signal generation unit 2033, a multiplexing unit 2034, and a wireless transmission unit 2035. The reception unit 204 is configured to include a wireless reception unit 2041, a demultiplexing unit 2042, and a signal detection unit 2043.

The higher layer processing unit 201 outputs the uplink data (transport block) generated by the operation of the user or the like, and outputs it to the transmission unit 203. The higher layer processing unit 201 processes a Medium Access Control (MAC) layer, a Packet Data Convergence Protocol (PDCP) layer, a Radio Link Control (RLC) layer, and a Radio Resource Control (RRC).

The higher layer processing unit 201 outputs information indicating the function of a terminal device which is supported by the terminal device, to the transmission unit 203.

The radio resource control unit 2011 manages various types of setting information of the terminal device. Further, the radio resource control unit 2011 generates information to be arranged in each channel of the uplink, and outputs it to the transmission unit 203.

The scheduling information analysis unit 2012 interprets the downlink control information received through the reception unit 204 to determine scheduling information. Further, the scheduling information interpretation unit 2012 generates control information for controlling the reception unit 204 and the transmission unit 203, based on the scheduling information, and outputs it to the control unit 202.

The control unit 202 controls the reception unit 204 and the transmission unit 203, based on the information input from the higher layer processing unit 201. The control unit 202 outputs the generated control signal to the reception unit 204 and the transmission unit 203 to control the reception unit 204 and the transmission unit 203. The control unit 202 outputs the uplink control information including the terminal information and the uplink data to the transmission unit 203. Here, the terminal information includes information indicating whether or not the terminal device has a function of demodulating the high-frequency band signal.

The control unit 202 receives setting information indicating whether or not the received signal is a high-frequency band signal, through the higher layer from the base station apparatus, and outputs the control information indicating whether to perform demodulation by using the first frame structure, or to perform demodulation by using the second frame structure, to the reception unit 204.

The control unit 202 controls the transmission unit 203 so as to transmit the CSI generated by the channel state information generation unit 205 to the base station apparatus.

The reception unit 204 separates, demodulates, and decodes a reception signal received from the base station apparatus through the transmission/receive antenna 206, according to the control signal input from the control unit 202, and outputs the decoded information to the higher layer processing unit 201. The reception unit 204 performs demodulation corresponding to the first frame structure or the second frame structure, according to the control signal input from the control unit 202.

The wireless reception unit 2041 converts the downlink signal received through the transmission/receive antenna 206 into a baseband digital signal, by using frequency conversion, filtering, AD conversion, amplitude control or the like.

The wireless reception unit 2041 removes a portion corresponding to CP from the converted digital signal, performs fast Fourier transform on the signal obtained by removing the CP, and extracts a signal in the frequency domain.

The demultiplexing unit 2042 separates the extracted signal into each one of PHICH, PDCCH, EPDCCH, PDSCH, and/or the downlink reference signal. Further, the demultiplexing unit 2042 performs compensation of the channels of PHICH, PDCCH, and EPDCCH, based on the estimated value of the channel of the desired signal obtained from channel measurement, detects the downlink control information, and outputs it to the control unit 202. Incidentally, in a case where the received signal is a signal transmitted using the second frame structure, when the downlink control information is not transmitted in the second frame structure, the demultiplexing unit 2042 does not perform the detection of the downlink control information. Further, the control unit 202 outputs channel estimation values of PDSCH and the desired signal to the signal detection unit 2043. The channel estimation is performed based on the number of layers addressed to the terminal device input from the control unit 202, an antenna port number, and scrambling identity.

The signal detection unit 2043 detects downlink data (transport block) by using the PDSCH and the channel estimation value, and outputs it to the higher layer processing unit 201.

The transmission unit 203 generates an uplink reference signal, according to the control signal input from the control unit 202, encodes and modulates the uplink data (transport block) input from the higher layer processing unit 201, multiplexes PUCCH, PUSCH, and the generated uplink reference signal, and transmits them to the base station apparatus through the transmission/receive antenna 206.

Incidentally, in a case where the second frame structure is used only in the downlink, the transmission unit 203 generates an uplink signal by using the first frame structure.

The encoding unit 2031 performs encoding such as convolution encoding and block coding on the uplink control information input from the higher layer processing unit 201. The encoding unit 2031 performs turbo coding based on the information used for scheduling of PUSCH.

The modulation unit 2032 modulates the coded bits input from the encoding unit 2031 with a modulation scheme such as such as BPSK, QPSK, 16 QAM, or 64 QAM notified in the downlink control information, or with a modulation scheme which is determined in advance for each channel.

The uplink reference signal generation unit 2033 generates a sequence obtained by a predetermined rule (equation), based on a physical cell identity (PCI, referred to as a Cell ID or the like) for identifying the base station apparatus 1, a bandwidth for placing the uplink reference signal, cyclic shift which is notified in a uplink grant, values of parameters for generating the DMRS sequence, or the like.

The multiplexing unit 2034 rearranges the modulation symbols of PUSCH in parallel and performs Discrete Fourier Transform (DFT), according to the control signal input from the control unit 202. Further, the multiplexing unit 2034 multiplexes the signals of PUCCH and PUSCH and the generated uplink reference signal for each transmit antenna port. Further, the multiplexing unit 2034 arranges the signals of PUCCH and PUSCH and the generated uplink reference signal in resource elements for each transmit antenna port. In addition, the discrete Fourier transform may be fast Fourier transform corresponding to the number of subcarriers of PUCCH and PUSCH.

The wireless transmission unit 2035 performs modulation of an SC-FDMA scheme by performing inverse fast Fourier transform on multiplexed signals to generate SC-FDMA symbols, and adds a CP to the generated SC-FDMA symbols to generate a baseband digital signal. The wireless transmission unit 2035 converts the generated digital signal of the baseband into an analog signal of a desired band, by using filtering, DA conversion, frequency conversion, power amplification and the like. The wireless transmission unit 2035 outputs and transmits the generated analog signal to the transmission/receive antenna 206.

FIG. 5 is a diagram illustrating a processing flow of the demultiplexing unit 2042 and the signal detection unit 2043.

In S501, the terminal device determines whether there is an indication of high-frequency band communication received in a higher layer from the base station apparatus. If the indication of high-frequency band communication is detected, the process proceeds to S502. If the indication of high-frequency band communication is not detected, the process proceeds to S503.

In S502, the signal detection unit 2043 performs demodulation by using the second frame structure.

In S503, the signal detection unit 2043 performs demodulation by using the first frame structure.

It is possible to receive a broadband signal by performing the processes as described above, thereby improving throughput.

The programs operating in the base station apparatus and the terminal device according to the present invention are programs for controlling the CPU and the like so as to realize the functions of the above embodiments according to the present invention (programs for causing a computer to function). Information handled by these devices is temporarily stored in the RAM at the time of processing, and thereafter is stored in various ROMs and HDDs, and is read, modified and written by the CPU as needed. Examples of the recording medium for storing the program include a semiconductor medium (for example, a ROM, a nonvolatile memory card, or the like), an optical recording medium (for example, a DVD, an MO, an MD, a CD, a BD, or the like), or a magnetic recording medium (for example, a flexible disk, or the like). Further, the functions of the above-described embodiments are realized by executing the loaded program, and the functions of the invention may be realized by processing in cooperation with the operating system or another application program or the like based on the instruction of the program, in some cases.

In the case of distribution to the market, it is possible to store and distribute the program in a portable recording medium, or transfer the program to a server computer connected through a network such as the Internet. The storage device of the server computer is also included in the present invention. In addition, some or all of the terminal device and the base station apparatus according to the above-described embodiments may be realized as an LSI which is a typical integrated circuit. The functional blocks of the reception device may be individually formed into chips, or some or all of them may be integrated into chips. When respective functional block are integrated, an integrated circuit control unit for controlling them is added.

In addition, a method of forming an integrated circuit is not limited to LSI, and it may be realized by a dedicated circuit or a general-purpose processor. In addition, when advances in semiconductor technology have led to the development of integrated circuit technology to replace LSI, it is also possible to use an integrated circuit according to the technology.

The present invention is not limited to the above-described embodiment. The terminal device of the present invention is not limited to application to a mobile station apparatus but can be applied to stationary or non-movable type electronic equipment installed indoors or outdoors, and it goes without saying that it can be applied to, for example, AV equipment, kitchen equipment, cleaning and laundry equipment, air conditioning equipment, office equipment, vending machine, other living equipment, and the like.

Although the embodiment of the present invention has been described above in detail with reference to the drawings, the specific configuration is not limited to this embodiment, and designs and the like within the scope without departing from the gist of the present invention are included in the scope of the claims.

INDUSTRIAL APPLICABILITY

The present invention is suitable for use in a terminal device, a base station apparatus, and a communication method.

Note that this international application claims priority based on Japanese Patent Application No. 2014-190869 filed on Sep. 19, 2014, and all the contents of Japanese Patent Application No. 2014-190869 are incorporated into this international application.

REFERENCE SIGNS LIST

1 BASE STATION APPARATUS
2 TERMINAL DEVICE
1-1 COVERAGE
101 HIGHER LAYER PROCESSING UNIT
102 CONTROL UNIT
103 TRANSMISSION UNIT
104 RECEPTION UNIT
105 TRANSMISSION/RECEIVE ANTENNA
1011 RADIO RESOURCE CONTROL UNIT
1012 SCHEDULING UNIT
1031 ENCODING UNIT
1032 MODULATION UNIT
1033 DOWNLINK REFERENCE SIGNAL GENERATION UNIT
1034 MULTIPLEXING UNIT
1035 WIRELESS TRANSMISSION UNIT
1041 WIRELESS RECEPTION UNIT
1042 DEMULTIPLEXING UNIT
1043 DEMODULATION UNIT
1044 DECODING UNIT
201 HIGHER LAYER PROCESSING UNIT
202 CONTROL UNIT
203 TRANSMISSION UNIT
204 RECEPTION UNIT
205 CHANNEL STATE INFORMATION GENERATION UNIT
206 TRANSMISSION/RECEIVE ANTENNA
2011 RADIO RESOURCE CONTROL UNIT
2012 SCHEDULING INFORMATION INTERPRETATION UNIT
2031 ENCODING UNIT
2032 MODULATION UNIT
2033 UPLINK REFERENCE SIGNAL GENERATION UNIT
2034 MULTIPLEXING UNIT
2035 WIRELESS TRANSMISSION UNIT
2041 WIRELESS RECEPTION UNIT
2042 DEMULTIPLEXING UNIT
2043 SIGNAL DETECTION UNIT

The invention claimed is:

1. A terminal apparatus configured to communicate with a base station apparatus, the terminal apparatus comprising:
reception circuitry configured selectively to receive either first OFDM symbols in a first frame structure or second OFDM symbols in a second frame structure, and
demodulation circuitry configured to selectively demodulate either the first OFDM symbols or the second OFDM symbols, wherein
the first frame structure is used in a first cell,
the second frame structure is used in a second cell, the second cell being different from the first cell,
the first frame structure includes a plurality of first subframes each including 14 first OFDM symbols,
the second frame structure includes a plurality of second subframes each including 14 second OFDM symbols, the plurality of second subframes being grouped into one or more groups,
spacing between a plurality of subcarriers in each of the second OFDM symbols is m times 15 kHz where m is a natural number equal to a quantity of groups into which the plurality of second subframes are grouped,
duration for each of the plurality of first subframe is 1 ms and duration for groups into which the plurality of second subframes are grouped is 1 ms,
a cell-specific reference signal is included in the first frame structure, and the cell-specific reference signal is not included in the second frame structure.

2. The terminal apparatus according to claim 1, wherein the terminal apparatus is configured to communicate with the base station apparatus by using a plurality of serving cells including a primary cell and a secondary cell.

3. A base station apparatus configured to communicate with a terminal apparatus, the base station apparatus comprising:

modulation circuitry configured to take a plurality of bits as input and produce modulation symbols, transmission circuitry configured selectively either to produce first OFDM symbols by using the modulation symbols and transmit the first OFDM symbols in a first frame structure, or produce second OFDM symbols by using the modulation symbols and transmit the second OFDM symbols in a second frame structure, wherein the first frame structure is used in a first cell, the second frame structure is used in a second cell, the second cell being different from the first cell, the first frame structure includes a plurality of first subframes each having 14 first OFDM symbols the second frame structure includes a plurality of second subframes each having 14 second OFDM symbols, the plurality of second subframes being grouped into one or more groups, spacing between a plurality of subcarriers in each of the second OFDM symbols is m times 15 kHz where m is a natural number equal to a quantity of groups into which the plurality of second subframes are grouped, duration for each of the plurality of first subframes is 1 ms and duration of the subframe group in the second frame structure is 1 ms, a cell-specific reference signal is included in the first frame structure, and the cell-specific reference signal is not included in the second frame structure.

4. The base station apparatus according to claim 3, wherein the base station apparatus is configured to communicate with the terminal apparatus by using a plurality of serving cells including a primary cell and a secondary cell.

5. A communication method for a terminal apparatus configured to communicate with a base station apparatus, the communication method comprising:

selectively receiving either first OFDM symbols in a first frame structure or second OFDM symbols in a second frame structure, and selectively demodulating either the first OFDM symbols or the second OFDM symbols, wherein the first frame structure is used in a first cell, the second frame structure is used in a second cell, the second cell being different from the first cell, the first frame structure includes a plurality of first subframes each having 14 first OFDM symbols, the second frame structure includes a plurality of second subframes each having 14 second OFDM symbols, the plurality of second subframes being grouped into one or more groups, spacing between a plurality of subcarriers in each of the second OFDM symbols is m times 15 kHz where m is a natural number equal to a quantity of groups into which the plurality of second subframes are grouped, duration for each of the plurality of first subframes is 1 ms and duration for groups into which the plurality of second subframes is 1 ms, a cell-specific reference signal is included in the first frame structure, and the cell-specific reference signal is not included in the second frame structure.

6. A communication method for a base station apparatus configured to communicate with a terminal apparatus, the communication method comprising:

taking a plurality of bits as input and producing modulation symbols, selectively either producing first OFDM symbols by using the modulation symbols and transmitting the first OFDM symbols in a first frame structure, or producing second OFDM symbols by using the modulation symbols and transmitting the second OFDM symbols in a second frame structure, wherein the first frame structure is used in a first cell, the second frame structure is used in a second cell, the second cell being different from the first ell, the first frame structure includes a plurality of first subframes each having 14 first OFDM symbols, the second frame structure includes a plurality of second subframes each having 14 second OFDM symbols, the plurality of second subframes being grouped into one or more groups, spacing between a plurality of subcarriers in each of the second OFDM symbols is m times 15 kHz where m is a natural number, m is equal to a quantity of groups into which the plurality of second subframes are grouped, duration for each of the plurality of first subframes is 1 ms and duration for groups into which the plurality of second subframes is 1 ms, a cell-specific reference signal is included in the first frame structure, and the cell-specific reference signal is not included in the second frame structure.

* * * * *